(12) United States Patent
You et al.

(10) Patent No.: US 12,340,610 B1
(45) Date of Patent: Jun. 24, 2025

(54) UTILIZING MACHINE LEARNING TO DETERMINE A DOCUMENT PROVIDER

(71) Applicant: Workday, Inc., Pleasanton, CA (US)

(72) Inventors: Charles You, Austin, TX (US); Yunxing Zhang, Fremont, CA (US); Harikrishna Narayanan, Fremont, CA (US); Timothy Lee, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 346 days.

(21) Appl. No.: 17/537,220

(22) Filed: Nov. 29, 2021

(51) Int. Cl.
| | |
|---|---|
| *G06V 30/412* | (2022.01) |
| *G06F 16/93* | (2019.01) |
| *G06N 20/00* | (2019.01) |
| *G06T 7/70* | (2017.01) |
| *G06V 10/70* | (2022.01) |
| *G06V 30/418* | (2022.01) |

(52) U.S. Cl.
CPC ............ *G06V 30/412* (2022.01); *G06F 16/93* (2019.01); *G06N 20/00* (2019.01); *G06T 7/70* (2017.01); *G06V 10/70* (2022.01); *G06V 30/418* (2022.01); *G06T 2207/30176* (2013.01)

(58) Field of Classification Search
CPC .... G06V 30/412; G06V 10/70; G06V 30/418; G06V 10/44; G06V 10/75; G06V 30/10; G06V 10/20; G06V 10/40; G06V 10/82; G06V 10/764; G06V 30/40; G06V 30/413; G06V 30/19173; G06V 10/225; G06V 30/274; G06V 20/95; G06V 30/19147; G06V 30/36; G06V 10/774; G06V 20/80; G06V 30/42; G06V 30/19; G06V 30/186; G06F 16/93; G06F 16/353; G06F 18/214; G06F 40/284; G06F 40/216; G06F 40/30; G06F 18/2431; G06F 18/253; G06F 40/279; G06F 18/29; G06N 20/00; G06N 3/045; G06N 3/08; G06N 3/044; G06N 7/01; G06N 3/042; G06T 7/70; G06T 2207/30176; G06T 1/00; G06T 2207/20021

See application file for complete search history.

(56) References Cited

U.S. PATENT DOCUMENTS

| | | | |
|---|---|---|---|
| 10,839,245 B1* | 11/2020 | Dhillon | ................. G06F 18/217 |
| 11,102,244 B1* | 8/2021 | Jakobsson | ............... H04L 51/42 |
| 2006/0215878 A1* | 9/2006 | Maeda | ..................... B07C 3/14 |
| | | | 382/101 |

(Continued)

OTHER PUBLICATIONS

Devlin et al., BERT: Pre-training of Deep Bidirectional Transformers for Language Understanding, May 24, 2019.

(Continued)

*Primary Examiner* — Sumati Lefkowitz
*Assistant Examiner* — Aaron Joseph Sorrin
(74) *Attorney, Agent, or Firm* — Van Pelt, Yi & James LLP

(57) ABSTRACT

A document is received from a document provider. A representation of the document provider associated with the document within a document provider space is determined based at least in part on text boxes and corresponding coordinates associated with the text boxes within the document. The document provider associated with the document is determined based on a measure of similarity. A database is updated to associate the document with the determined document provider.

15 Claims, 7 Drawing Sheets

(56) References Cited

U.S. PATENT DOCUMENTS

| | | | | |
|---|---|---|---|---|
| 2011/0258181 A1* | 10/2011 | Brdiczka | ............... | G06F 16/355 |
| | | | | 707/723 |
| 2014/0177951 A1* | 6/2014 | Biffar | ................... | G06V 10/225 |
| | | | | 382/161 |
| 2020/0273078 A1* | 8/2020 | Xu | ......................... | G06Q 30/04 |
| 2022/0156300 A1* | 5/2022 | Paruchuri | ................ | G06N 3/08 |
| 2022/0156488 A1* | 5/2022 | Mokhtari | .............. | G06F 40/284 |

OTHER PUBLICATIONS

Reimers et al., Sentence-BERT: Sentence Embeddings using Siamese BERT-Networks, Aug. 27, 2019.

Xu et al., LayoutLM: Pre-training of Text and Layout for Document Image Understanding, Jun. 16, 2020.

* cited by examiner

| Input | [CLS] | my | dog | is | cute | [SEP] | he | likes | play | ##ing | [SEP] |
|---|---|---|---|---|---|---|---|---|---|---|---|
| Token Embeddings | $E_{[CLS]}$ | $E_{my}$ | $E_{dog}$ | $E_{is}$ | $E_{cute}$ | $E_{[SEP]}$ | $E_{he}$ | $E_{likes}$ | $E_{play}$ | $E_{\#\#ing}$ | $E_{[SEP]}$ |
| | + | + | + | + | + | + | + | + | + | + | + |
| Segment Embeddings | $E_A$ | $E_A$ | $E_A$ | $E_A$ | $E_A$ | $E_A$ | $E_B$ | $E_B$ | $E_B$ | $E_B$ | $E_B$ |
| | + | + | + | + | + | + | + | + | + | + | + |
| Position Embeddings | $E_0$ | $E_1$ | $E_2$ | $E_3$ | $E_4$ | $E_5$ | $E_6$ | $E_7$ | $E_8$ | $E_9$ | $E_{10}$ |

UTILIZING MACHINE LEARNING TO DETERMINE A DOCUMENT PROVIDER

BACKGROUND OF THE INVENTION

A document provider (e.g., enterprise, business, government, institution, organization, etc.) may send and receive many documents during the normal course of operation. A document receiver (e.g., enterprise, business, government, institution, organization, etc.) may employ a person to manage documents received from a plurality of different document providers. However, for large document receivers, such a task may become too cumbersome. The task may be offloaded to a third-party document processing system that employs automated document management processes.

The third-party document processing system is tasked with associating received documents with a particular entity, such as a particular document provider. However, the format across the received documents may not be uniform. As a result, it may be difficult to implement automated document management processes to accurately associate a received document with a particular document provider. Other systems may implement techniques, such as term frequency-inverse document frequency (TD-IDF) or fuzzy matching, to associate a received document with a particular document provider. However, such techniques lack the accuracy necessary to provide a robust document processing system.

BRIEF DESCRIPTION OF THE DRAWINGS

Various embodiments of the invention are disclosed in the following detailed description and the accompanying drawings.

FIG. 7 illustrates an example of an input to a transformer model.

DETAILED DESCRIPTION

Figure 1:
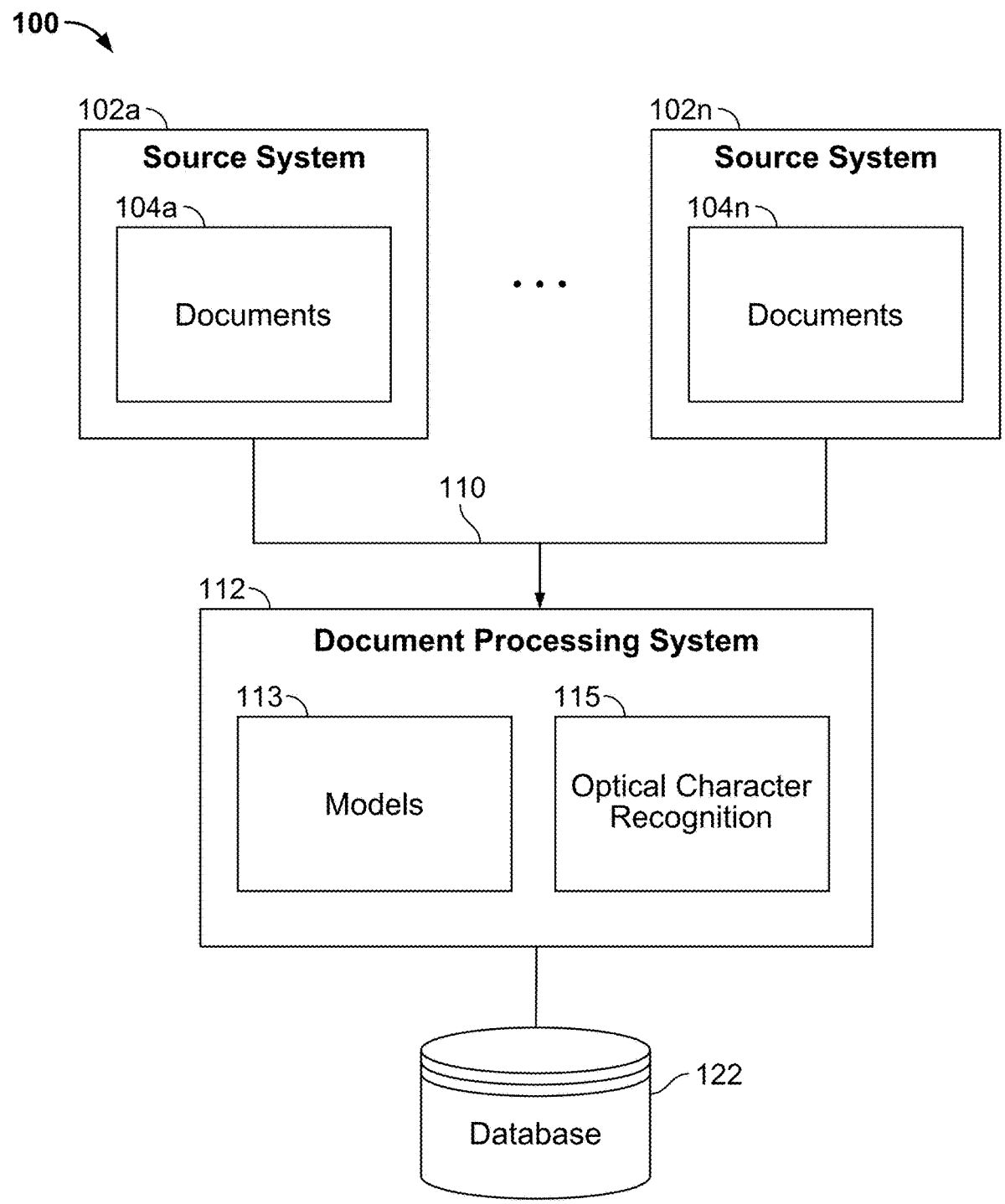
FIG. 1 is a block diagram illustrating an embodiment of a system for associating a document with a particular document provider.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to accurately associate a received document with a particular document provider is disclosed herein. Although the disclosed technique is described with respect to determining which document provider sent a document, the disclosed technique may also be used in determining which document receiver received the document. The format across a plurality of documents received from different document providers (e.g., directly from a document provider or indirectly from a document provider via an intermediary) may not be uniform. However, the information included in a document received from the document providers may include at least some of the same types of information. For example, a document may include one or more of a name, an address, phone number, a date, a quantity, an invoice number, a description, a sub-amount, a total amount, etc.

A plurality of document providers may have provided, either explicitly or implicitly, document provider information to the document processing system. The document processing system may train a first machine learning model to generate a representation of each document provider (e.g., an embedding) within a document provider space based on some or all of the document provider information. Each of the document providers has a corresponding location within the document provider space.

The document processing system may receive a document from an unknown document provider. The document processing system analyzes the received document to determine an actual provider of the received document. The document processing system analyzes the received document in part by performing image analysis on the document to generate raw text in the form of a plurality of text boxes. The document processing system determines corresponding coordinates for each of the text boxes. The document processing system may include a second machine learning model that is trained and configured to output a representation of a document provider associated with the received document (e.g., an embedding) within the document provider space based on the plurality of text boxes and the corresponding coordinates.

The document processing system determines which of the plurality of document providers corresponds to the document provider associated with the received document by computing a measure of similarity. An output of the measure of similarity is based on the representation of a document provider within the document provider space outputted by the first machine learning model and the representation of the document provider associated with the received document within the document provider space outputted by the second machine learning model. In some embodiments, the measure of similarity is a cosine similarity. The document processing system determines the document provider associated with the received document to be the document provider having the highest measure of similarity (e.g., the document provider closest to the determined representation of the document provider associated with the received document within the document provider space).

The document processing system updates a database to associate the received document with the determined document provider. The document processing system may provide a portal that enables the document provider to view any associated documents. The document processing system may generate a report based on information included in a document.

In some embodiments, the system improves the computer by enabling more efficient recognition of a document provider. The system enables efficient use of processor and memory resources by providing more accurate determination of document providers.

FIG. 1 is a block diagram illustrating an embodiment of a system for associating a document with a particular document provider. In the example shown, system 100 includes source systems 102a . . . 102n coupled to document processing system 112. Although FIG. 1 depicts two source systems, system 100 may include 1: n source systems.

Source systems 102a . . . 102n may be a computer, server, a virtual machine, a database, an application, a container, a cloud computing device, and/or any other computing device capable of generating a document. In some embodiments, source systems 102a . . . 102n are associated with a single provider (e.g., a user, an enterprise, a government, a company, an organization, a group, etc.). In some embodiments, source system 102a is associated with a first document provider and source system 102n is associated with an nth document provider. In some embodiments, a plurality of document providers are associated with one or more corresponding source systems that are coupled to document processing system 112.

Source systems 102a . . . 102n respectively generate and store documents 104a . . . 104n. Documents 104a . . . 104n may be generated by a word processing application, a spreadsheet application, a presentation program, etc. Documents 104a . . . 104n may be in different format types, such as portable document format (PDF), encapsulated postscript (EPS), joint photographic experts group (JPEG), tagged image file format (TIFF), portable network graphics (PNG), etc. Examples of documents include an invoice, a receipt, a contract, a timesheet, an employee employment agreement, tax documents, a purchase order, etc.

Source systems 102a . . . 102n may provide a document to document processing system 112 via network 110. In some embodiments, an intermediary (not shown) receives a document from source systems 102a . . . 102n via network 110 and provides the document to document processing system 112 via network 110. Network 110 may be a local area network, a wide area network, a storage area network, campus area network, metropolitan area network, system area network, intranet, the Internet, and/or a combination thereof.

In some embodiments, an electronic version of a document is provided to document processing system 112. In some embodiments, a physical copy of a document is provided to document processing system 112.

Document processing system 112 may be a server, a computing cluster that includes a plurality of computing nodes, a virtual machine running on a computing device (e.g., a computer), a containerized application running on a computing device, one or more cloud computing devices, etc.

Document processing system 112 includes optical character recognition software 115 that is configured to recognize text within a document. In some embodiments, document processing system 112 includes an optical character reader to recognize raw text within a physical document. Optical character recognition software 115 is configured to generate text boxes for raw text included in the document and corresponding coordinates associated with each of the text boxes.

Document processing system 112 includes a plurality of models 113. A first model of the plurality of models 113 is configured to generate a corresponding embedding associated with a plurality of document providers. The first model may be based on a Bidirectional Encoder Representation from Transformers (BERT) model, a neural network based language model, or other natural language processing model. The first model may be pre-trained using the raw data from a plurality of documents of a particular type to learn the structure of documents associated with a particular document provider. The pre-trained model may be trained using labeled data.

In some embodiments, a document provider may explicitly or implicitly provide document provider information to document processing system 112. For example, document processing system 112 may provide to a document provider an intake form that includes a plurality of fields. For example, the field inputs may include name, alternative name, address, phone number, etc. Document processing system 112 may use information included in some or all of the fields as input to train the first model. In response to receiving such information, the first model is configured to generate an embedding for a document provider within the document provider space.

The information associated with each of a plurality of document providers may be provided to the first model. In response, the first model is configured to generate a corresponding embedding for each of the document providers within the document provider space. The embeddings for the document providers are pre-generated before documents are received from source systems 102a . . . 102n. Document processing system 112 stores the embeddings in a memory and/or storage device associated with document processing system 112.

A second model of the plurality of models 113 is configured to generate for a document an embedding within a document provider space based on the texts boxes and corresponding coordinates included in the document. The embedding associated with the document provider represents a location of a document provider associated with the received document within the document provider space. The second model may be based on a BERT model, a neural network based language model, or other natural language processing model. In some embodiments, the second model is based on a LayoutLM model.

When document processing system 112 receives a document from a source system, document processing system 112 may determine an embedding for the document provider associated with the received document and determine whether the embedding for document provider associated with the received document matches any of the stored document provider embeddings. In response to determining a match, document processing system 112 updates a database 122 to associate the received document with a document provider. For example, the accounts payable system or accounts receivable system associated with a document provider may be updated based on the received document.

The amount of time to determine a match is significantly reduced by pre-generating the embeddings for the document providers because document processing system 112 does not need to use additional time and computational resources to generate an embedding for each document provider while the step of determining a match is performed. The match may be quickly determined (e.g., within a few seconds) instead of a longer period of time (e.g., an hour). In the event the embeddings for the document providers were not pre-generated, document processing system 112 would have to generate an embedding for each document provider each time a document is received from one of the source systems 102a . . . 102n.

In some embodiments, when document processing system 112 receives a document from a source system, document processing system 112 may determine an embedding for the document receiver associated with the received document and determine whether the embedding for document receiver associated with the document matches any of the stored document receiver embeddings. In response to determining a match, document processing system 112 updates database 122 to associate the received document with a document receiver. For example, a company may have in different regions. The embedding for the document receiver associated with the received document may indicate whether an office located in a first region received the document or an office located in a second region received the document.

Figure 2:
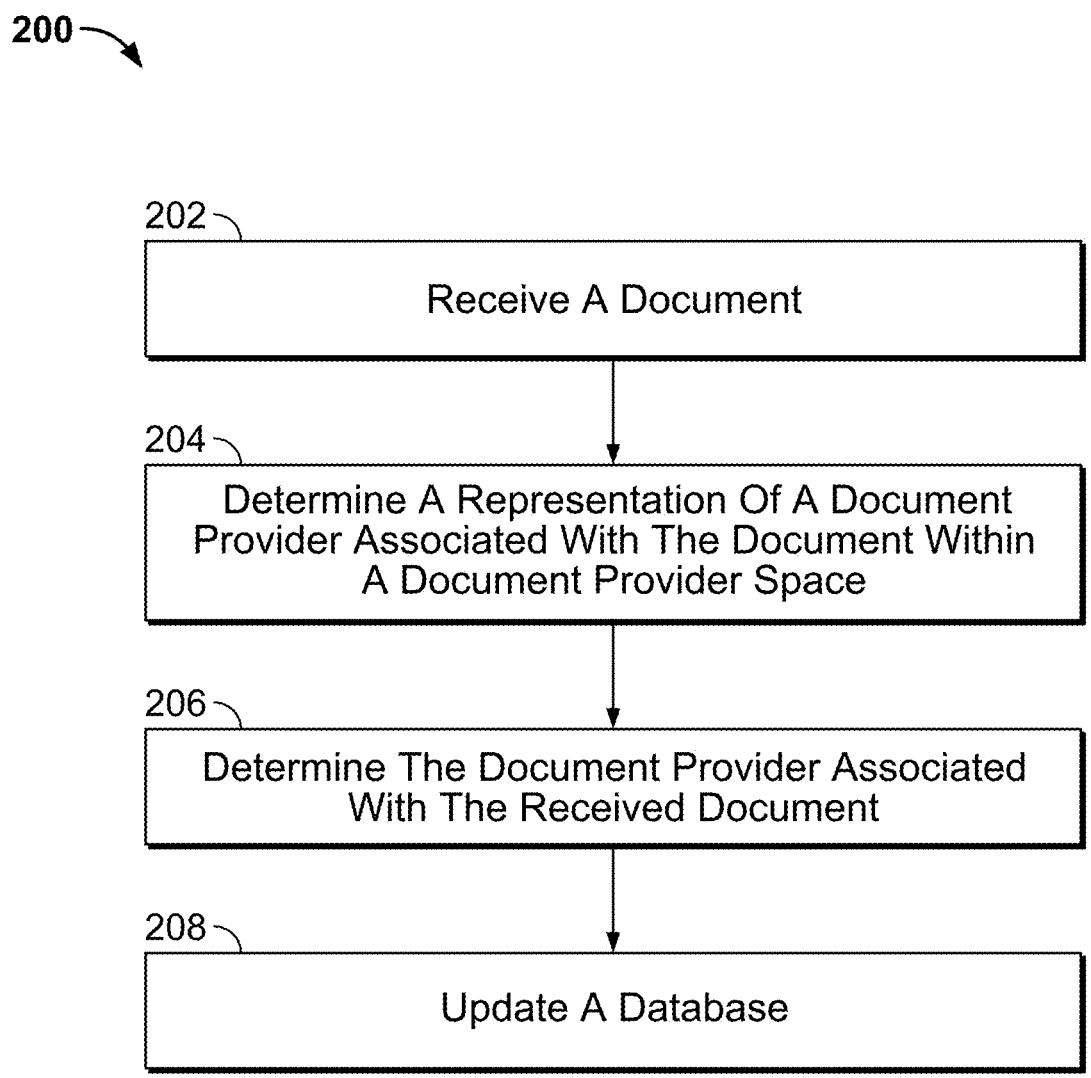
FIG. 2 is a flow diagram illustrating an embodiment of a process for associating a document with a particular document provider.

FIG. 2 is a flow diagram illustrating an embodiment of a process for associating a document with a particular document provider. In the example shown, process 200 may be implemented by a document processing system, such as document processing system 112.

At 202, a document is received from a source system. In some embodiments, the document is received from a source system via an intermediary. In some embodiments, the document is a physical version of a document. In some embodiments, the document is an electronic version of a document. The document includes a plurality of text. The format across a plurality of documents of a particular type received from different document providers may not be uniform. In some embodiments, the format across a plurality of documents of a particular type received from the same document provider is not the same. However, the information included in a document of a particular type received from the document providers may include at least some of the same types of information.

At 204, a representation of a document provider associated with the received document within a document provider space is determined. Image analysis is performed on the document to generate raw text in the form a plurality of text boxes. Corresponding coordinates within the document are generated for each of the plurality of text boxes. The plurality of text boxes and corresponding coordinates are inputted a machine learning model that is configured to output a representation of a document provider associated with the received document within a document provider space.

At 206, a document provider associated with the received document is determined. Representations for a plurality of document providers within the document provider space are stored. The document provider associated with the received document is determined by computing a measure of similarity between the representation of the document provider associated with the received document within the document provider space and the representation of a document provider within the document provider space. The measure of similarity is computed for each of the document providers. The document provider having the highest determined measure of similarity is determined to be the document provider associated with the received document.

At 208, a database is updated to associate the document with the determined document provider.

Figure 3:
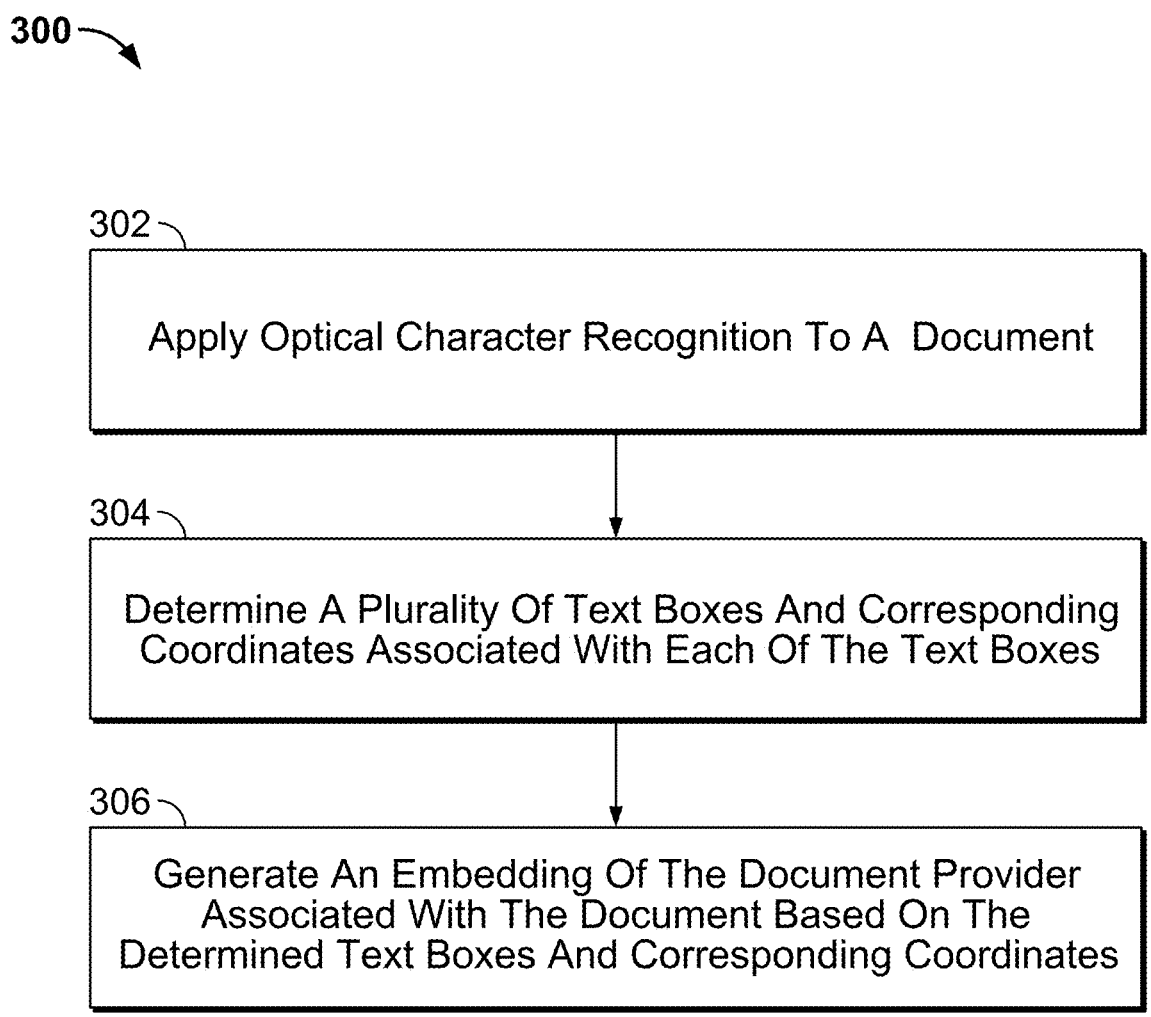
FIG. 3 is a flow diagram illustrating an embodiment of a process for determining a representation of a document provider associated with a document within a document provider space.

FIG. 3 is a flow diagram illustrating an embodiment of a process for determining a representation of a document provider associated with a document within a document provider space. In the example shown, process 300 may be implemented by a document processing system, such as document processing system 112. In some embodiments, process 300 is implemented to perform some or all of step 204 of process 200.

At 302, optical character recognition is applied to a document. The document includes a plurality of words. Text boxes are generated that delineates the words into separate fields.

At 304, a plurality of text boxes and corresponding coordinates associated with each of the text boxes are determined. The coordinates for a text box may be a center coordinate, an upper left coordinate, an upper right coordinate, an upper center coordinate, a center left coordinate, a center right coordinate, a lower left coordinate, a lower center coordinate, or a lower right coordinate. However, the coordinates used are consistent for each of the text boxes (e.g., all center coordinates).

At 306, an embedding of the document provider associated with the document is generated based on the determined text boxes and corresponding coordinates. The determined texts boxes and corresponding coordinates are provided as input to a machine learning model that is trained and configured to output a representation of a document provider associated with the document within a document provider space. The embedding represents the document provider associated with the document as a vector within the document provider space.

The input to the model includes a text embedding, a relative position embedding, and a key embedding. The machine learning model may be trained, as described in process 600, using key-value pairs instead of segments of texts. The key embedding enables a document provider embedding to be generated for the document instead of a document embedding.

Figure 4:
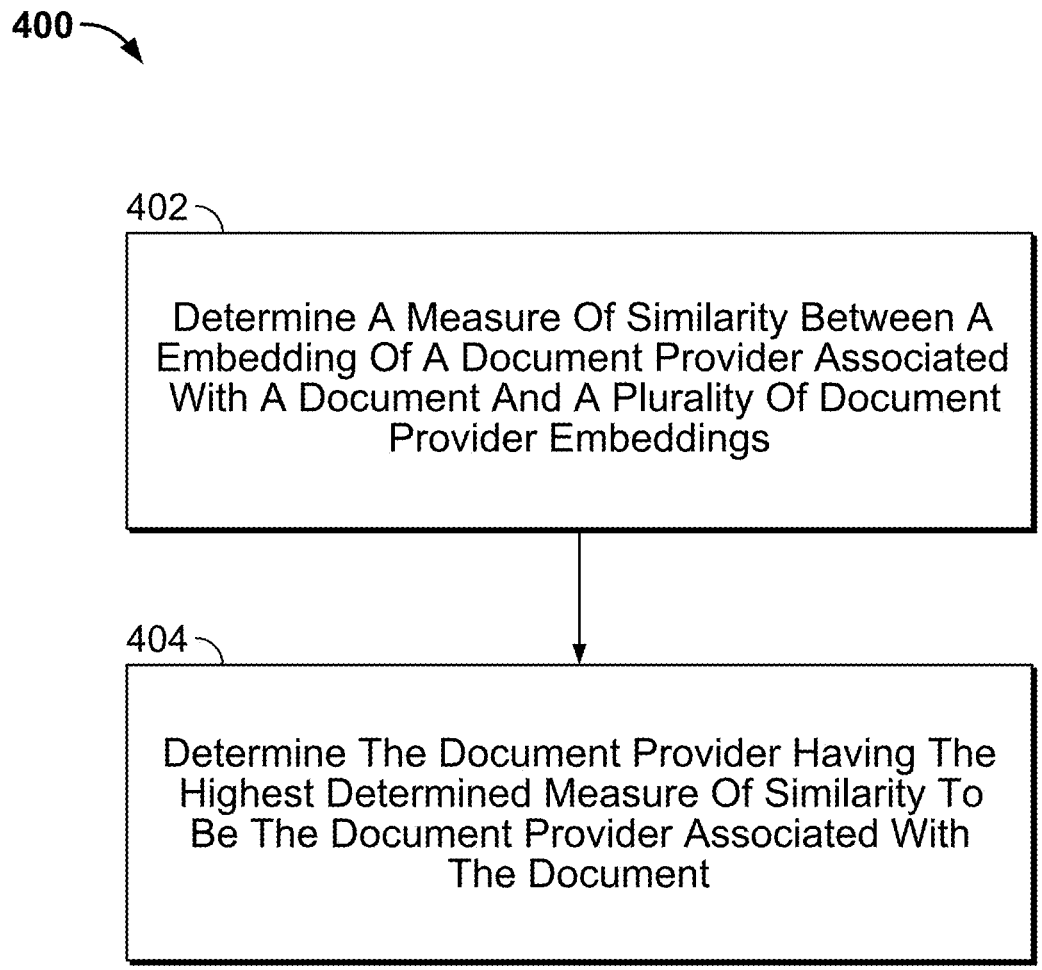
FIG. 4 is a flow diagram illustrating a process for determining a document provider associated with a document in accordance with some embodiments.

FIG. 4 is a flow diagram illustrating a process for determining a document provider associated with a document in accordance with some embodiments. In the example shown, process 400 may be implemented by a document processing system, such as document processing system 112. In some embodiments, process 400 is implemented to perform some or all of step 206 of process 200.

At 402, a measure of similarity between an embedding of a document provider associated with a document and a plurality of document provider embeddings are determined. In some embodiments, the measure of similarity is a cosine similarity. Each of the plurality of document provider embeddings is pre-generated and stored. The amount of time to determine the measure of similarity is significantly reduced because additional time and computational resources are not needed to generate an embedding for each document provider while determining the measure of similarity. The measure of similarity may be quickly determined (e.g., within a few seconds) instead of a longer period of time (e.g., an hour).

At 404, a document provider having the highest determined measure of similarity is determined to be the document provider associated with the document.

Figure 5:
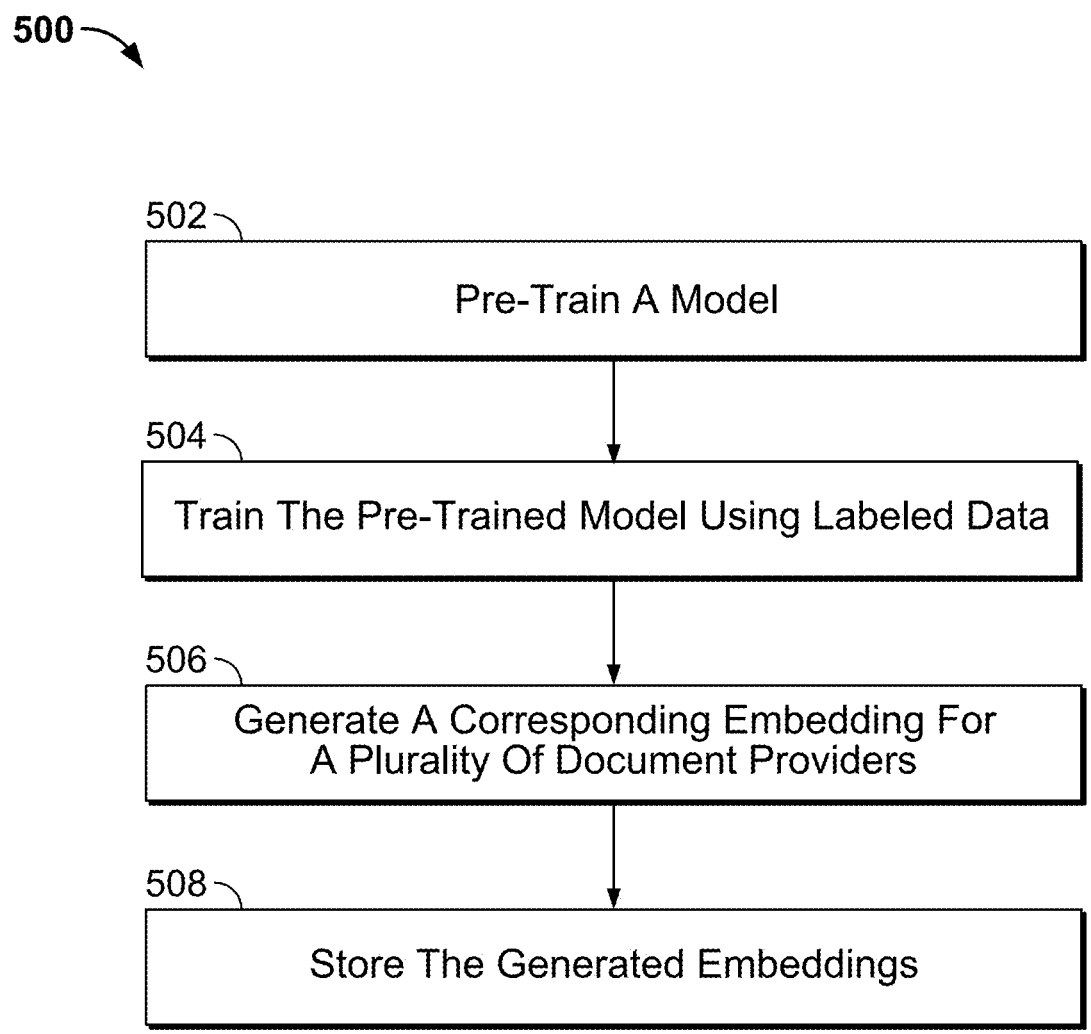
FIG. 5 is a flow diagram illustrating a process for pre-generating representations of a plurality of document providers within a document provider space in accordance with some embodiments.

FIG. 5 is a flow diagram illustrating a process for pre-generating representations of a plurality of document providers within a document provider space in accordance with some embodiments. In the example shown, process 500 may be implemented by a document processing system, such as document processing system 112. In some embodiments, the model trained using process 500 is implemented to pre-generate and store the document provider embeddings used in step 402 of process 400.

At 502, a model is pre-trained. The model is pre-trained using raw data to learn the structure of information associated with a document provider. The information may be provided by explicitly provided by a document provider or implicitly determined from documents associated with a document provider.

The model may be a masked language model. In some embodiments, information associated with a document provider is masked to understand the structure of information associated with the document provider. For example, the model may be pre-trained by masking a particular percentage of the words in the information associated with a document provider to understand the structure of information associated with a particular document provider. Masking too few words in the document provider information may be too expensive to pre-train the model. Masking too many words in the document provider information may not provide enough context to accurately pre-train the model. In some embodiments, the particular percentage is 15%. In some embodiments, the model is pre-trained to understand the structure of information associated with a document provider, such as name, alternative name, address, phone number, alternative phone numbers, etc.

At 504, the pre-trained model is trained using labeled data. In the above example, the labeled data may indicate which part of the document provider information corresponds to a name, which part of the document provider information corresponds to an address, and which part of the document provider information corresponds to a phone number. The labeled data may indicate the one or more names associated with a supplier, an address associated with a supplier, and/or a phone number associated with a supplier.

In some embodiments, the pre-trained model is trained using a supervised machine learning algorithm. For example, the supervised machine learning algorithm may be a linear regression algorithm, a logistical regression algorithm, a random forest algorithm, a gradient boosted trees algorithm, a support vector machines algorithm, a neural networks algorithm, a decision tree algorithm, a Naïve Bayes algorithm, a nearest neighbor algorithm, or any other type of supervised machine learning algorithm. In some embodiments, the pre-trained model is trained using a semi-supervised machine learning algorithm that utilizes one or more labeled data sets and one or more pseudo-labeled data sets.

In the embodiments, the pre-trained model is trained using a reinforcement machine learning algorithm. For example, the reinforcement machine learning algorithm may be a Q-Learning algorithm, a temporal difference algorithm, a Monte-Carlo tree search algorithm, an asynchronous actor-critic agent's algorithm, or any other type of reinforcement machine learning algorithm.

After the model is trained, the model is configured to output a document provider embedding within a document provider space based on input data.

At 506, a corresponding embedding is generated for a plurality of document providers.

In some embodiments, information associated with each of the document providers is provided to the trained machine learning model, which outputs a corresponding embedding for each of the plurality of document providers.

In some embodiments, documents associated with a plurality of document providers are provided to a document processing system. For each document, image analysis is performed on the document to generate raw text in the form of a plurality of text boxes. Corresponding coordinates within the document are generated for each of the plurality of text boxes. The plurality of text boxes and corresponding coordinates are inputted to the trained machine learning model. The trained machine learning model outputs a document provider embedding within a document provider space.

At 508, the generated document provider embeddings are stored in a memory and/or storage of the document processing system.

Figure 6:
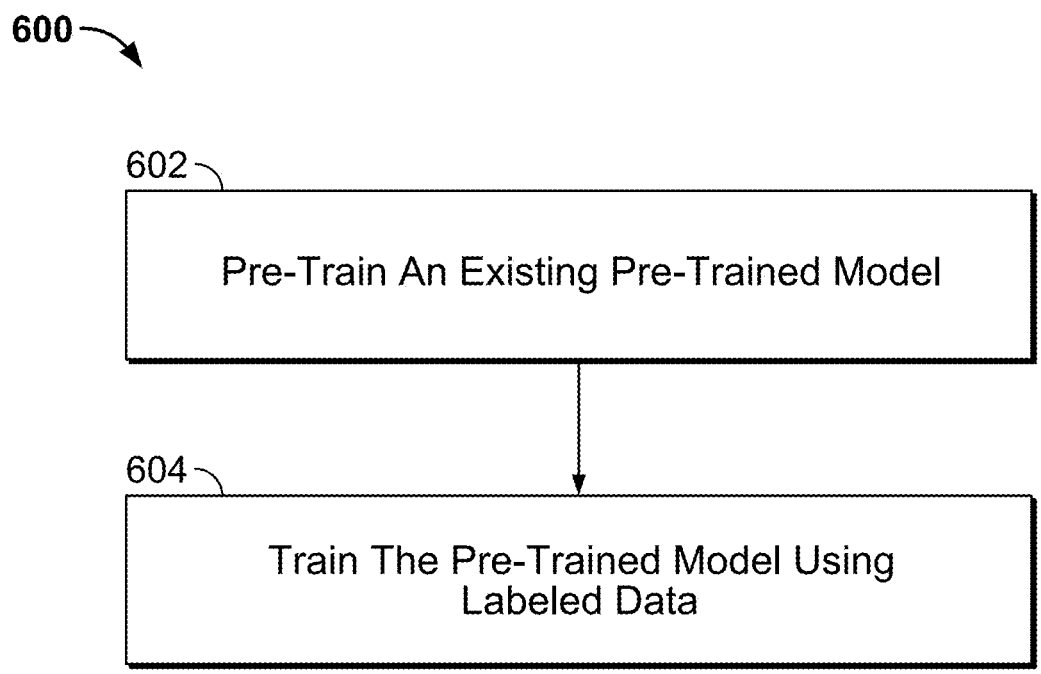
FIG. 6 is a flow diagram illustrating a process for training a machine learning model in accordance with some embodiments.

FIG. 6 is a flow diagram illustrating a process for training a machine learning model in accordance with some embodiments. In the example shown, process 600 may be implemented by a document processing system, such as document processing system 112. In some embodiments, the model trained using process 600 is implemented to perform step 306 of process 300.

At 602, an existing pre-trained model is pre-trained for a particular type of document. The existing pre-trained model has been trained on many document types. For example, the existing pre-trained model may be a masked language model, such as a LayerLM model. The existing pre-trained model is pre-trained using a plurality of documents of the particular type. A plurality of documents of the particular type are provided as input to the existing pre-trained model to pre-train the existing pre-trained model. Subsequently, the pre-trained model is configured to understand the structure of the document of the particular type.

The raw data of a document may be segmented into a plurality of text boxes. The information included in a text box may be represented using a key-value pair. For example, an invoice associated with a document provider, such as a supplier, may be represented as:

Supplier: {
  Name: "Acme Corporation",
  Alt Names: ["Acme Rocket-Powered Products, Inc."],
  Address: "1 Main St. Fairfield, NJ 07004 USA",
  Phone #: "12345678890",
}

The model may be based on a BERT (Bidirectional Encoder Representations from Transformations) model or other transformer model. FIG. 7 illustrates an example 700 of a BERT model. The input to a BERT model includes a text embedding, a relative position embedding, and a segment embedding. As seen in FIG. 7, each part of the input "my dog is cute he likes playing" has a corresponding token embedding, a corresponding segment embedding, and a corresponding position embedding. A first portion of the input "my dog is cute" is associated with a first segment embedding (EA) and a second portion of the input "he likes playing" is associated with a second segment embedding (EB). Segment embeddings are used to generate a document embedding for a document. In the example shown in FIG. 7, the token embeddings comprise an embedding for a word, a delimeter, or a suffix (e.g., for input of "[CLS] my dog is cute [SEP] he likes play ##ing [SEP]," a token set of embeddings may be $E_{[CLS]}$, $E_{my}$, $E_{dog}$, $E_{is}$, $E_{cute}$, $E_{[SEP]}$, $E_{he}$, $E_{likes}$, $E_{play}$, $E_{\#\#ing}$, and $E_{[SEP]}$). In the example shown in FIG. 7, the token embeddings comprise an embedding for a word, a delimeter, or a suffix (e.g., for input of "[CLS] my dog is cute [SEP] he likes play ##ing [SEP]," a token set of embeddings may be $E_0$, $E_1$, $E_2$, $E_3$, $E_4$, $E_5$, $E_6$, $E_7$, $E_8$, $E_9$, and $E_{10}$).

In contrast, the input to the model includes a text embedding, a relative position embedding, and a key embedding, that is, the segment embedding is replaced with the key embedding. This enables the model to be trained using key-value pairs instead of segments of text. The key embedding enables a document provider embedding to be generated for the document instead of a document embedding.

The model may be a masked language model. For example, the model may be pre-trained by masking a particular percentage of the words in a document to understand the structure of a document associated with a particular document provider. Masking too few words in a document may be too expensive to pre-train the model. Masking too many words in the document may not provide enough context to accurately pre-train the model. In some embodiments, the particular percentage is 15%. In some embodiments, the model is pre-trained to understand the structure of a document, such as an invoice, a receipt, a contract, a timesheet, an employee employment agreement, tax documents, etc.

At 604, the pre-trained model is trained using labeled data. In the above example, the labeled data may indicate which part of a document corresponds to a name, which part of the document corresponds to an address, and which part of the document corresponds to a phone number. The labeled data may indicate the one or more names associated with a supplier, an address associated with a supplier, and/or a phone number associated with a supplier.

In some embodiments, the pre-trained model is trained using a supervised machine learning algorithm. For example, the supervised machine learning algorithm may be a linear regression algorithm, a logistical regression algorithm, a random forest algorithm, a gradient boosted trees algorithm, a support vector machines algorithm, a neural networks algorithm, a decision tree algorithm, a Naïve Bayes algorithm, a nearest neighbor algorithm, or any other type of supervised machine learning algorithm. In some embodiments, the pre-trained model is trained using a semi-supervised machine learning algorithm that utilizes one or more labeled data sets and one or more pseudo-labeled data sets. In the embodiments, the pre-trained model is trained using a reinforcement machine learning algorithm. For example, the reinforcement machine learning algorithm may be a Q-Learning algorithm, a temporal difference algorithm, a Monte-Carlo tree search algorithm, an asynchronous actor-critic agent's algorithm, or any other type of reinforcement machine learning algorithm.

After the model is trained, the model is configured to output an embedding for a document provider associated with a received document within a document provider space based on a document of the particular type being provided as input to the trained model.

In some embodiments, the models trained at 504 and 604 are jointly fine-tuned.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a document from a document provider;
determining an embedding corresponding to the document provider associated with the document within a document provider space, wherein corresponding embeddings of document providers within the document provider space are pre-generated, wherein the corresponding embeddings of the document providers within the document provider space are pre-generated in part by pre-training an existing machine learning model to output the corresponding embeddings of the document providers, wherein the corresponding embeddings of the document providers are pre-generated in part by providing the existing machine learning model a plurality of training documents of a particular type, wherein raw data of a training document of the plurality of training documents is segmented into a plurality of text boxes and information included in the text box is represented using a key-value pair, wherein determining the embedding corresponding to the document provider associated with the document within the document provider space comprises performing optical character recognition on the document to generate text boxes and corresponding coordinates associated with the text boxes within the document, and providing a text embedding associated with the document, a relative position embedding associated with the document, and a key embedding associated with document as input to the pre-trained machine learning model to determine the embedding corresponding to the document provider;
determining the document provider associated with the document based on a measure of similarity between the embedding corresponding to the document provider associated with the document and the corresponding embeddings of the document providers; and
updating a database to associate the document with the determined document provider based on the determined measure of similarity.

2. The method of claim 1, wherein determining the representation of the document provider associated with the document within the document provider space includes performing image analysis on the received document.

3. The method of claim 1, wherein the corresponding coordinates associated with the text boxes are corresponding center coordinates associated with the text boxes.

4. The method of claim 1, wherein the machine learning model represents the document provider associated with the document as a vector within the document provider space.

5. The method of claim 1, wherein the measure of similarity is a cosine similarity.

6. The method of claim 1, wherein the document provider associated with the document is determined to be the document provider that is closest to the representation of the document provider associated with the document within the document provider space.

7. The method of claim 1, wherein the machine learning model is a masked language model.

8. The method of claim 7, wherein the machine learning model is trained using labeled data.

9. The method of claim 8, wherein the machine learning model generates corresponding representations of document providers within the document provider space.

10. The method of claim 9, wherein the corresponding representations of document providers within the document provider space are stored.

11. A system, comprising:
a processor configured to:
receive a document from a document provider;
determine an embedding corresponding to the document provider associated with the document within a document provider space, wherein corresponding embeddings of document providers within the document provider space are pre-generated, wherein the corresponding embeddings of the document providers within the document provider space are pre-generated in part by pre-training an existing machine learning model to output the corresponding embeddings of the document providers, wherein the corresponding embeddings of the document providers are pre-generated in part by providing the existing machine learning model a plurality of training documents of a particular type, wherein raw data of a training document of the plurality of training documents is segmented into a plurality of text boxes and information included in the text box is represented using a key-value pair, wherein determining the embedding corresponding to the document provider associated with the document within the document provider space comprises performing optical character recognition on the document to generate text boxes and corresponding coordinates associated with the text boxes within the document, and providing a text embedding associated with the document, a relative position embedding associated with the document, and a key embedding associated with document as input to the pre-trained machine learning model to determine the embedding corresponding to the document provider;
determine the document provider associated with the document based on a measure of similarity between the embedding corresponding to the document provider associated with the document and the corresponding embeddings of the document providers; and
update a database to associate the document with the determined document provider based on the determined measure of similarity; and
a memory coupled to the processor and configured to provide the processor with instructions.

12. The system of claim 11, wherein to determine the representation of the document provider associated with the document within the document provider space, the processor is configured to perform image analysis on the document.

13. The system of claim 11, wherein the corresponding coordinates associated with the text boxes are corresponding center coordinates associated with the text boxes.

14. The system of claim 11, wherein the measure of similarity is a cosine similarity.

15. A computer program product embodied in a non-transitory computer readable medium and comprising computer instructions for:
receiving a document from a document provider;
determining an embedding corresponding to the document provider associated with the document within a document provider space, wherein corresponding embeddings of document providers within the document provider space are pre-generated, wherein the corresponding embeddings of the document providers within the document provider space are pre-generated in part by pre-training an existing machine learning model to output the corresponding embeddings of the document providers, wherein the corresponding embeddings of the document providers are pre-generated in part by providing the existing machine learning model a plurality of training documents of a particular type, wherein raw data of a training document of the plurality of training documents is segmented into a plurality of text boxes and information included in the text box is represented using a key-value pair, wherein determining the embedding corresponding to the document provider associated with the document within the document provider space comprises performing optical character recognition on the document to generate text boxes and corresponding coordinates associated with the text boxes within the document, and providing a text embedding associated with the document, a relative position embedding associated with the document, and a key embedding associated with document as input to the pre-trained machine learning model to determine the embedding corresponding to the document provider;
determining the document provider associated with the document based on a measure of similarity between the embedding corresponding to the document provider associated with the document and the corresponding embeddings of the document providers; and
updating a database to associate the document with the determined document provider based on the determined measure of similarity.

* * * * *